United States Patent
Hurley et al.

(10) Patent No.: US 6,754,433 B2
(45) Date of Patent: Jun. 22, 2004

(54) IMAGE DATA RECORDING AND TRANSMISSION

(75) Inventors: Terence Ralph Hurley, Newbury (GB); Jonathan James Stone, Reading (GB)

(73) Assignee: Sony Broadcast & Communication Limited, Basingstoke (GB)

(*) Notice: Subject to any disclaimer, the term of this patent is extended or adjusted under 35 U.S.C. 154(b) by 0 days.

(21) Appl. No.: 08/221,555

(22) Filed: Apr. 1, 1994

(65) Prior Publication Data

US 2003/0099466 A1 May 29, 2003

Related U.S. Application Data

(63) Continuation of application No. 07/913,407, filed on Jul. 15, 1992, now abandoned.

(30) Foreign Application Priority Data

Sep. 4, 1991 (GB) .............................................. 9118964

(51) Int. Cl.[7] .................................................. H04N 5/76
(52) U.S. Cl. ........................ 386/46; 386/111; 386/123; 375/240.11
(58) Field of Search ................................ 358/335, 342, 358/310; 360/33.1, 32; 348/398, 394, 395, 424, 335, 437, 441; 386/1, 5, 33, 35, 36, 37, 109, 111–112, 110, 122, 123; 375/240.11, 240.01, 240.02; H04N 5/76, 5/92, 7/26, 9/79

(56) References Cited

U.S. PATENT DOCUMENTS 3,048,652 A * 8/1962 Newell ...................... 358/310
4,517,597 A * 5/1985 Glenn ........................ 348/437
4,698,689 A * 10/1987 Tzou ......................... 358/133
4,733,299 A * 3/1988 Glenn ........................ 348/448
4,868,654 A * 9/1989 Juri et al. ................... 348/424
4,969,040 A * 11/1990 Gharavi .................. 375/240.11
5,001,559 A * 3/1991 Gonzales et al. ........... 358/133
5,055,927 A * 10/1991 Keesen et al. .............. 348/437
5,097,331 A * 3/1992 Chen et al. ................. 358/133
5,121,191 A * 6/1992 Cassereau et al. .......... 358/133
5,126,842 A * 6/1992 Andrews et al. ............ 358/133
5,128,754 A * 7/1992 Dhein ................... 375/240.11
5,159,460 A * 10/1992 Senso ........................ 358/310
5,179,442 A * 1/1993 Azadegan et al. .......... 358/133
5,276,525 A * 1/1994 Gharavi ..................... 348/398
5,715,104 A * 2/1998 Takada et al. .............. 386/112

FOREIGN PATENT DOCUMENTS

EP 0401854 * 12/1990

* cited by examiner

*Primary Examiner*—Thai Tran
(74) *Attorney, Agent, or Firm*—Frommer Lawrence & Haug LLP; William S. Frommer

(57) ABSTRACT

An image data recording and transmission system is described in which a data compressor 76 decorrelates input image data into sub band component data, a data recorder 78 stores the sub band data, a data decompressor 80 decompresses data read from the data recorder and a transmission signal generator 82 produces a bandwidth limited transmission signal from the decompressed data. The combined action of a data sequencer 18, a quantizer 114 and an entropy encoder 20 within the data compressor act to remove from the data stream that information corresponding to frequencies not transmittable with the bandwidth limited transmission signal (e.g. PAL or NTSC) subsequently produced by a transmission signal generator 82. Accordingly, the data recorder need not use storage capacity recording data which cannot be used by the transmission signal generator.

21 Claims, 6 Drawing Sheets

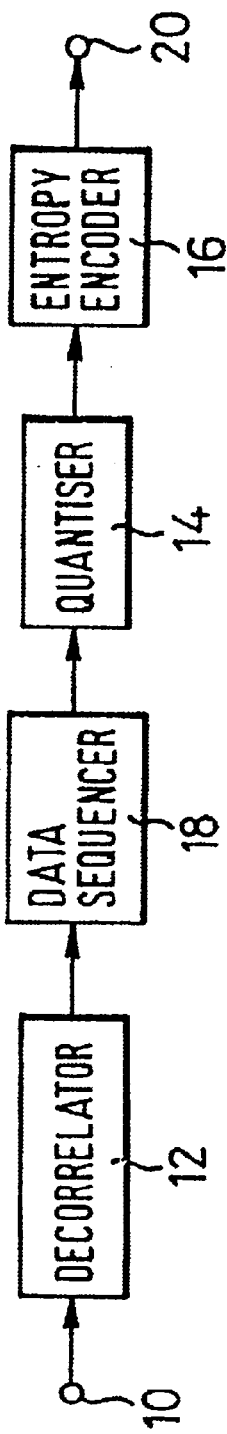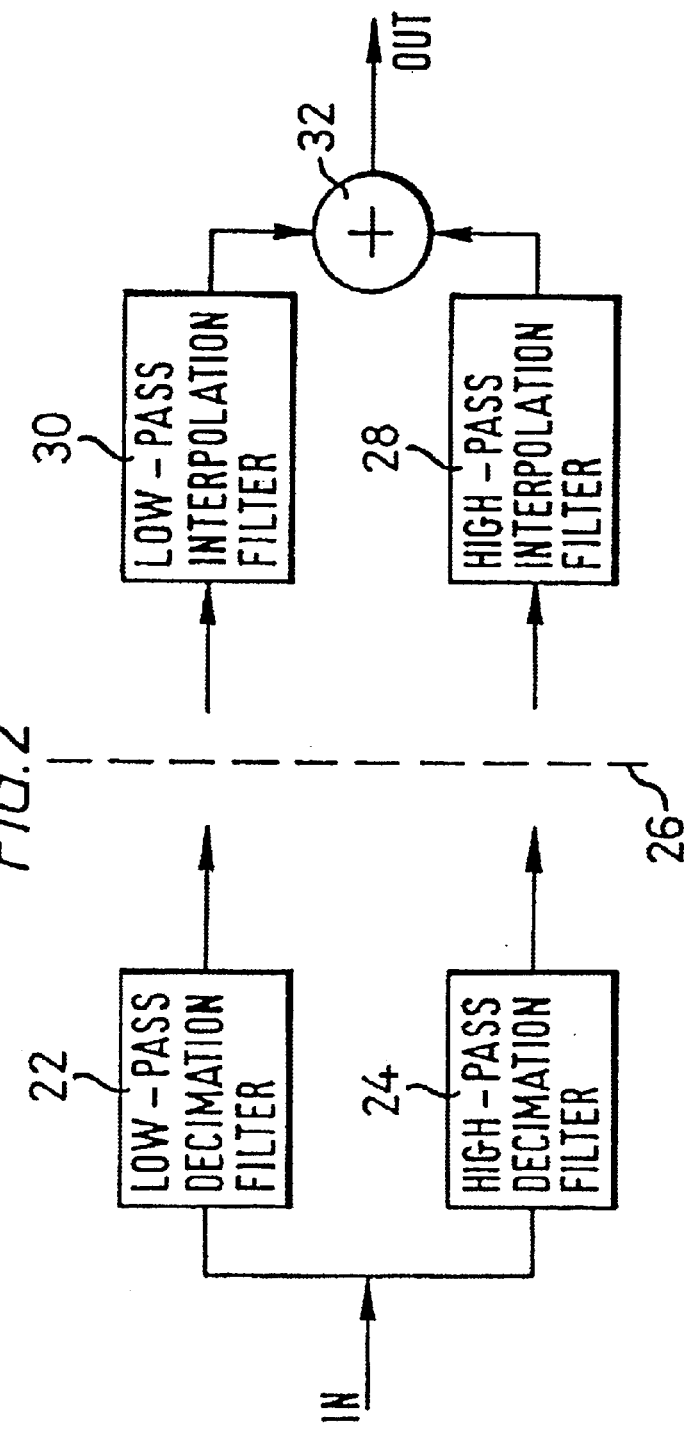

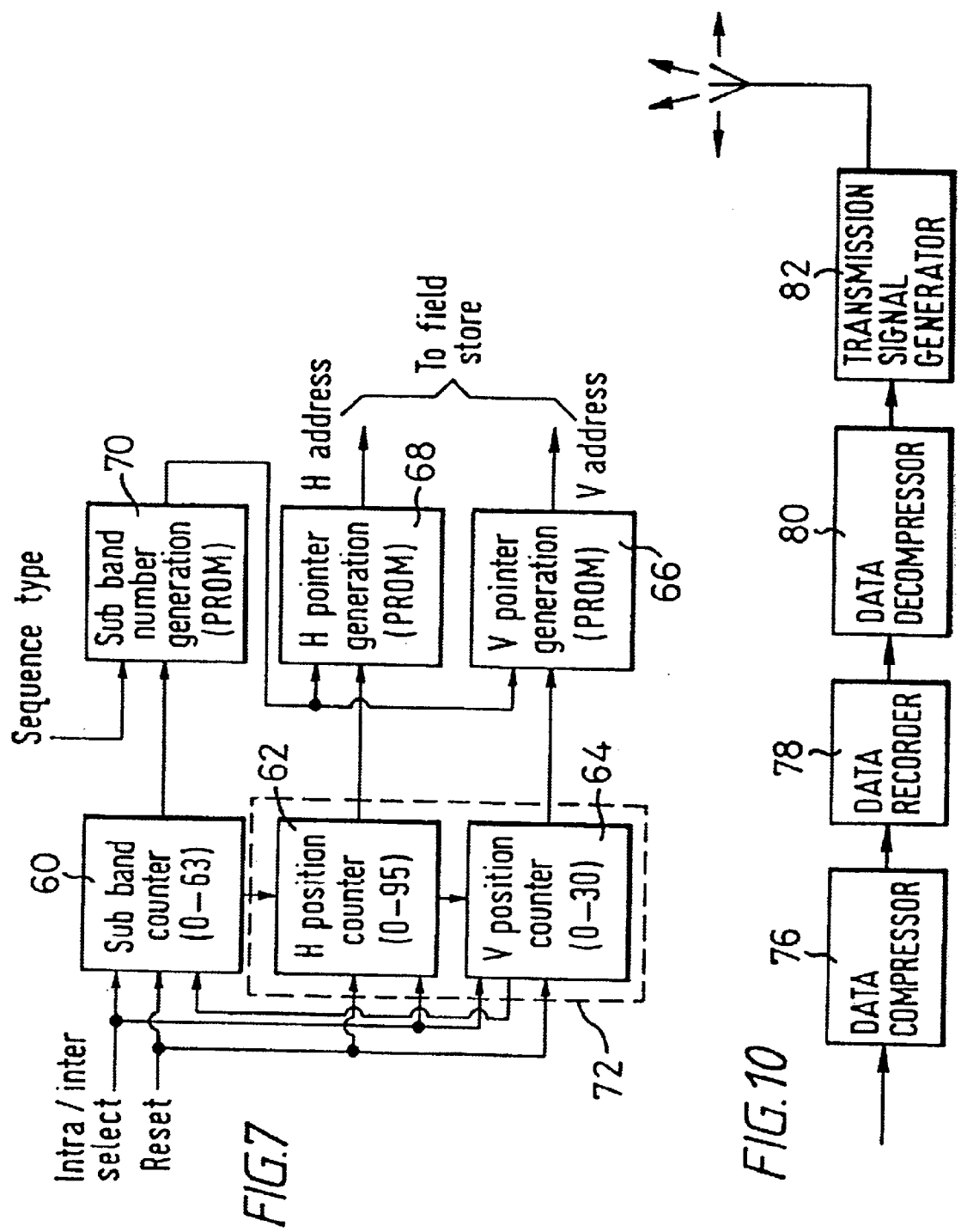

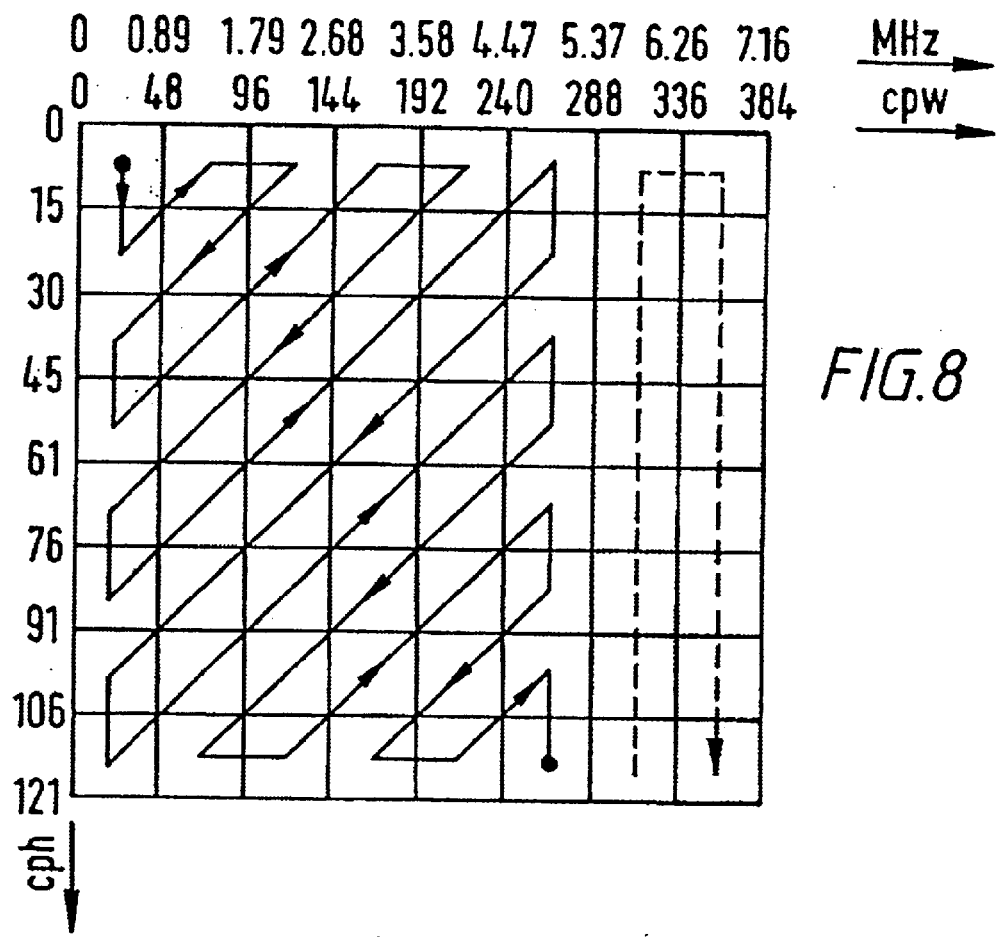

IMAGE DATA RECORDING AND TRANSMISSION

This application is a continuation of application Ser. No. 07/913,407, filed Jul. 15, 1992, now abandoned.

BACKGROUND OF THE INVENTION

1. Field of the Invention

This invention relates to the field of image data recording and transmission. More particularly, this invention relates image data recording and transmission in which image data is stored prior to transmission over a bandwidth limited transmission channel.

2. Description of the Prior Art

Known systems used in broadcast situations store high quality video image data on magnetic recording tape. The video image data is then read from the magnetic recording tape and transformed into a transmission signal format of reduced bandwidth.

A significant limiting performance parameter of most image data storage devices is the amount of data or number of images that can be stored. One way of decreasing the amount of space needed to store an image is to compress the image data with a technique such as that proposed by the Joint Photographic Experts Group and currently under review by the International Standards Organisation. It is an object of the invention to increase the number of images that can be stored.

SUMMARY OF THE INVENTION

Viewed from one aspect the invention provides an image data recording and transmission apparatus having:

(i) a decorrelator for producing frequency separated component data from input image data;

(ii) a recorder for storing frequency separated component data produced by said decorrelator;

(iii) an interpolator for producing reconstructed data from frequency component data stored by said recorder; and (iv) a transmission signal generator for producing a bandwidth limited transmission signal from reconstructed data produced by said interpolator, wherein said recorder stores substantially only that portion of frequency component data produced by said decorrelator corresponding to frequencies transmittable with said transmission signal.

The invention recognises that in a system in which the image data will be transmitted with a bandwidth limited signal there is no point in preserving information in the image data that cannot be represented by the transmission signal. Discarding such information does not degrade the quality of the image recoverable from the transmission signal, and yet allows an improved degree of data compression to be achieved.

In addition to recognising the above, the invention provides a particularly simple and efficient way of removing the excess data since for other data compression purposes the input image data may well have already undergone frequency separation. In this case, the overhead required to carry out the frequency separation is already present in the system and a relatively small modification in accordance with the invention allows the additional advantage of the invention to be realised.

In order to match the known NTSC transmission signal format said recorder stores substantially only that portion of frequency component data produced by said decorrelator corresponding to frequencies less than substantially 4.5 MHz.

Similarly, in order to match the known PAL transmission signal format said recorder stores substantially only that portion of frequency component data produced by said decorrelator corresponding to frequencies less than substantially 5.5 MHz.

Preferred embodiments of the invention enhance the data compression achieved with an entropy encoder for encoding frequency separated data prior to storage by said recorder and an entropy decoder for decoding frequency separated data read from said recorder.

Further improvements in data compression are achieved with a quantiser for quantising frequency separated data prior to storage by said recorder and a dequantiser for dequantising frequency separated data read from said recorder.

It will be appreciated that the frequency separation could be carried out by discrete cosine transformation of block of the image. However, improved performance is achieved when said decorrelator produces sub band component data representing different portions of the two-dimensional spatial frequency domain.

Since the decorrelation works on the basis of a two fold frequency division at each stage, an upper limit on the frequency of data extracted cannot be easily set if good frequency resolution is to be preserved at lower frequencies, e.g. if the signal undergoes a three stage frequency separation: to meet the required frequency resolution, it may be that the two uppermost bands are above the frequency that can be carried by the transmission channel. Accordingly, the output from the decorrelator may include high frequency information not required. One simple way of dealing with this is to configure the system such that said quantiser quantises sub band component data not transmittable with said transmission signal to a single value. Quantising to a single value, such as zero, effectively removes the unwanted information.

Preferred embodiments of the invention carry out the subsequent required filtering to remove the unwanted high frequency data utilising a data sequencer for sequencing sub band component data to separate sub band component data transmittable with said transmission signal from sub band component data not transmittable with said transmission signal.

In some embodiments said data sequencer removes sub band component data not transmittable with said transmission signal. Alternatively, said data sequencer sequences said sub band component data into an order in which sub band component data transmittable with said transmission signal is fed to said entropy encoder before sub band component data not transmittable with said transmission signal. Sequencing the data in this way allows an increase in the degree of compression achieved through entropy encoding by increasing the probability of long zero value run lengths and the occurrence of end of block codes.

Viewed from another aspect the invention provides an image data recording and transmission method comprising the steps of:

(i) decorrelating input image data to produce frequency separated component data;

(ii) storing frequency separated component data;

(iii) producing reconstructed data from stored frequency component data; and (iv) producing a bandwidth limited transmission signal from reconstructed data, wherein substantially only that portion of any frequency component data produced corresponding to frequencies transmittable with said transmission signal is stored.

The above, and other objects, features and advantages of this invention will be apparent from the following detailed description of illustrative embodiments which is to be read in connection with the accompanying drawings.

BRIEF DESCRIPTION OF THE DRAWINGS

FIG. 1 is a schematic illustration of a data compression apparatus;

FIG. 2 is a schematic illustration of a simple sub band coding apparatus;

FIG. 7 illustrates, a data sequencer circuit;

FIG. 8 illustrates the scan pattern effected by the data sequencer circuit of FIG. 7;

FIG. 9 shows a quantisation matrix;

FIG. 10 illustrates an image data recording and transmission apparatus;

DESCRIPTION OF THE PREFERRED EMBODIMENTS

Figure 3:
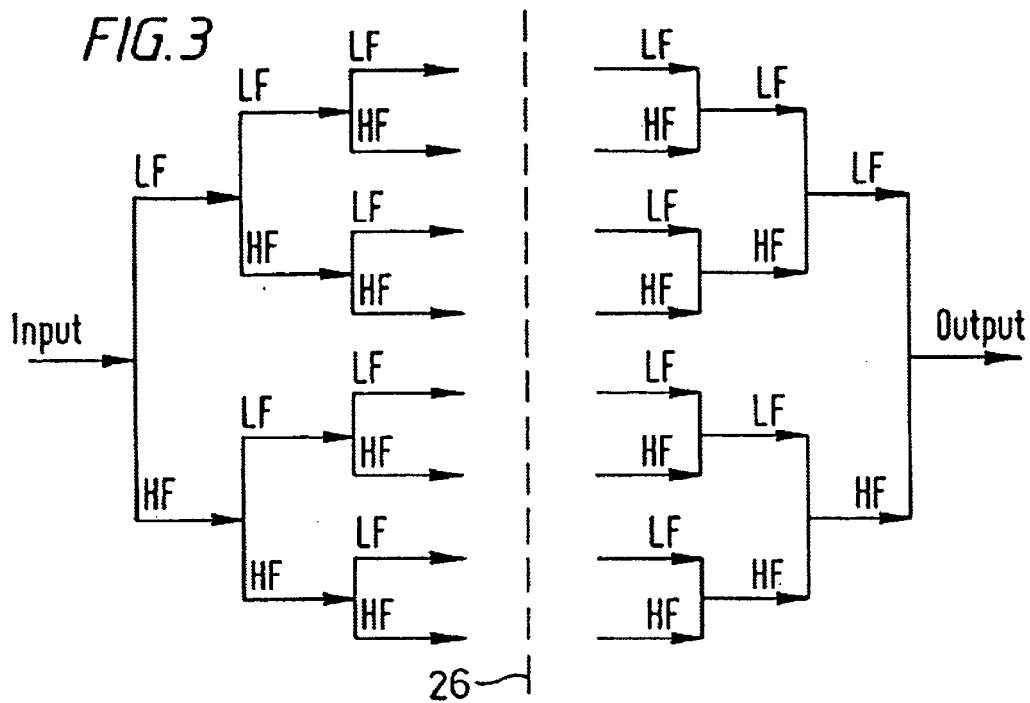
FIG. 3 is a schematic illustration of a higher order sub band coding system.

FIG. 1 shows an apparatus for effecting intra-image frequency separation and compression of a video signal in the two-dimensional spatial frequency domain. A video signal, which is in digital form and comprises successive multi-bit (for example 8-bit) samples or words each representing a respective pixel of a scanned image or picture, is applied via an input 10 to a decorrelator 12. A frequency separated video signal is outputted by the decorrelator 12 to a data sequencer 18 and then via a quantiser 14 to an entropy encoder 16, which together compress the frequency separated video signal outputted by the decorrelator 12 to produce a compressed signal on an output 20. The compressed signal is then stored. After storage, the compressed signal can be restored substantially to its original form by expansion by way of entropy decoding, resequencing, dequantising and recorrelation operations which employ parameters complementary to those used for decorrelation, sequencing, quantisation and entropy encoding, respectively, upon compression.

The operation of decorrelation performed in the decorrelator 12 relies upon the fact that neighbouring pixels of an image are highly correlated, whereby processing an image (for example, a field or frame of a video signal) to form frequency separated signal portions representing different components of the image in the two-dimensional spatial frequency domain enables a reduction in the amount of information needed to represent the image. Specifically, the frequency separated signal portions represent different spatial frequency components of the image.

The sequencing operation will be described in more detail below.

The quantisation operation, which is a lossy operation, in that it involves deliberate discarding of some frequency data considered to be redundant or of little importance to adequate perception of the image by the human psychovisual system, in itself enables some signal compression to be achieved. The quantiser 14 enables compression to be achieved in two ways: it reduces the number of levels to which the data inputted to it can be assigned, and it increases the probability of runs of zero value samples on the data it outputs. The ability to achieve enhanced signal compression provided by the operation of the quantiser is carried into effect in the entropy encoder 16 in that the reduction in information content achieved in the quantiser 14 enables a consequential bit (data) rate reduction to be achieved in the entropy encoder.

Further (non-lossy) compression, and bit (data) rate reduction, is provided in the entropy encoder 16 in which, in known manner, using for example variable length coding, the data produced by the quantiser 14 is encoded in such a manner that more probable (more frequently occurring) items of data produce shorter output bit sequences than less probable (less frequently occurring) ones. In this regard, the decorrelation operation has the effect of changing the probability of occurrence of any particular signal level, which is substantially the same for all possible levels before decorrelation, into a form in which it is much more probable that certain levels will occur than others.

The compression/coding system or apparatus as shown in FIG. 1 can be embodied in a variety of ways, using different forms of decorrelation. An increasingly popular form of implementation makes use of so-called transform coding, and in particular the form of transform known as the discrete cosine transform. The use of discrete cosine transformation for decorrelation is in fact prescribed in a version of the compression system of FIG. 1 described in a proposed standard prepared by the Joint Photographic Experts Group and currently under review by the International Standards Organisation. According to the transform technique of decorrelation, the signal is subjected to a linear transform (decorrelation) operation prior to quantisation and encoding. A disadvantage of the transform technique is that, although the whole image (for example, a whole field) should be transformed, this is impractical in view of the amount of data involved. The image (field) thus has to be divided into blocks (for example, of 8×8 samples representing respective pixels), each of which is transformed. That is, transform coding is complex and can be used on a block-by-block basis only.

A recently proposed approach to compression/coding in the frequency domain is that of sub-band coding. In this approach, the decorrelator 12 in the system of FIG. 1 would comprise a spatial (two-dimensional) sub-band filtering arrangement which divides the input video signal into a plurality of uncorrelated sub-bands each containing the spatial frequency content of the image in a respective one of a plurality of areas of a two-dimensional frequency plane of the image, the sub-bands then being selectively quantised by the quantiser 14 in accordance with their positions in the sensitivity spectrum of the human psychovisual system. That is, decorrelation is achieved in this case by putting the energy of the overall image into different sub-bands of the two-dimensional spatial frequency domain. Sub-band filtering is believed to provide better decorrelation than the transform approach. Also, unlike the transform technique, there is no restriction to operation on a block-by-block basis: the sub-band filtering can be applied directly to the video signal.

FIG. 2 illustrates a sub-band coding system in which the input video signal is passed through a low-pass decimation filter 22 and a high-pass decimation filter 24. The resulting two output signals represent different portions of the frequency spectrum of the input signal. The two signals are then quantised, sequenced and entropy encoded as discussed in relation to FIG. 1. The sub-band components of the input signal can now be transmitted or stored for later reproduction. The storage of the sub-band components is illustrated by the dashed line 26 in FIG. 2.

When the sub-band components are recovered from the recording medium they are passed through corresponding matching filters to regenerate the original frequency components. These matching filters are a low-pass interpolation filter 30 and a high-pass interpolation filter 28. The outputs of the interpolation filters 28, 30 are added by a summation circuit 32 to yield the original video input signal.

FIG. 2 illustrates the decomposition of the input video signal into two sub-bands. In practice, the input video signal would be decomposed into many more sub-band components. FIG. 3 illustrates the decomposition of an input signal into eight sub-band components and its subsequent recombination into an output video signal.

The filters of the sub-band coding system comprise finite impulse response filters with appropriate delays and weighting coefficients to perform both horizontal and vertical frequency decomposition. Different forms of filter for performing sub-band frequency separation are known, e.g. some possible filters are described in the article entitled 'Exact Reconstruction Techniques for Tree Structured Sub-Band Coders', in IEEE Transactions on Acoustics, Speech and Signal Processing, Volume ASSP-34 at pages 434 to 441, June 1986.

Figure 4:
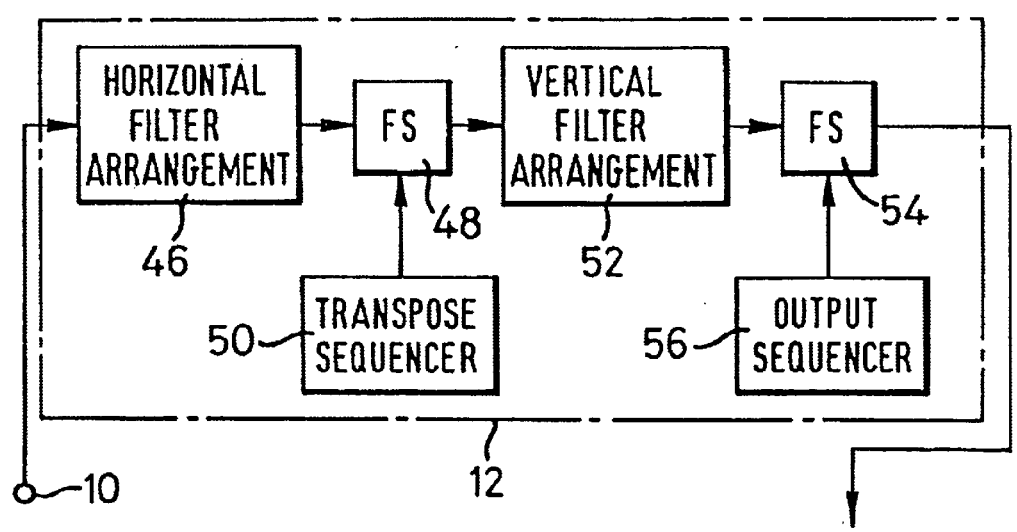
FIG. 4 illustrates a two-dimensional sub band decorrelator.

FIG. 4 illustrates the decorrelator 12 of FIG. 1 in more detail. The decorrelator comprises a horizontal filter arrangement 46, an intermediate field store 48, a transpose sequencer (address generator) 50, a vertical filter arrangement 52, an output field store 54 and an output sequencer (address generator) 56. Sub-band filtering is effected on a separable basis. Thus, in FIG. 4, filtering in the two orthogonal image directions, namely the horizontal direction (the direction of image scanning in the case of conventional video) and the vertical direction, is effected entirely independently and separately of one another by respective one-dimensional filtering operations performed in the horizontal and vertical filter arrangements 46 and 52, respectively.

The horizontal filter arrangement 46 and vertical filter arrangement 52 can be of substantially the same construction as one another. Thus, the construction of the horizontal filter arrangement 46 only will be described in detail. The filtering is to achieve 8 sub-bands in each of the horizontal and vertical directions, that is to say that a square array of 64 (8×8) sub-bands is to be produced. The 64 sub-bands are to be of equal extent to one another.

The horizontal filter arrangement 46 is preferably of a tree or hierarchical structure as shown in FIG. 3, comprising three successive filter stages. The first stage comprises a low pass filter (LF) and a high pass filter (HF), each of which is followed by a respective decimator (not shown). The LF filter, HF filter and the decimators together make up a quadrature mirror filter (QMF). Each of the filters can be a finite impulse response filter of conventional form. In use, a line of a field of the input digital video signal is applied, sample-by-sample, to the first stage, to be low pass filtered and high pass filtered by the LF and HF, respectively. Thus, the LF and HF produce outputs comprising low pass filtered and high pass filtered versions of the input line, respectively, the outputs representing the spatial frequency content of the line in the lower and upper halves of the horizontal spatial frequency range. That is, the first stage divides the input line into two sub-bands in the horizontal direction. The decimators decimate (sub-sample) the respective outputs by a factor of two, whereby the total number of samples outputted by the decimators (together) is the same as the total number of samples in the line.

The second stage is of similar construction to the first stage, except that there are two QMFs each as in the first stage and the output from each of the decimators of the first stage is passed as an input to a respective one of the two QMFs. Thus, the second stage produces four outputs representing the spatial frequency content of the line in four equal quarters of the horizontal spatial frequency range. That is, the second stage further divides the two sub-bands, into which the input line was divided in the first stage, into four sub-bands in the horizontal direction. The four decimators of the second stage decimate (sub-sample) the respective outputs by a factor of two, whereby the total number of samples outputted by the decimators of the second stage (together) is the same as the total number of samples in the line.

The third stage is of similar construction to the first stage, except that there are four QMFs each as in the first stage and the output from each of the four decimators of the second stage is passed as an input to a respective one of the four QMFs. Thus, the third stage produces eight outputs representing the spatial frequency content of the line in eight equal one-eighths of the horizontal spatial frequency range. That is, the third stage divides the four sub-bands into which the input line was previously divided into the required eight sub-bands in the horizontal direction. The eight decimators of the third stage decimate, (sub-sample) the respective outputs by a factor of two, whereby the total number of samples outputted by the decimators of the third stage (together) is the same as the total number of samples in the line.

The eight outputs of the third stage, that is of the horizontal filter arrangement 46, are passed to the intermediate field store 48 and stored at positions corresponding to respective one-eighths of a first line thereof. The above process of horizontal filtering is then repeated for all the other lines of the field of the input digital video signal. This results in the intermediate field store 48 containing a version of the field of the input digital video signal that has been filtered into; eight sub-bands in the horizontal direction (only). Each line of the field stored in the intermediate field store 48 is divided into eight portions each containing the horizontal spatial frequency information in a respective one of eight sub-bands of the horizontal spatial frequency range of the image that the original field represented. Thus, the horizontally filtered field stored in the intermediate field store 48 can be considered to be divided into eight columns.

The horizontally filtered field stored in the intermediate field store 48 is then fed (under the control of the transpose sequencer 50) into the vertical filter arrangement 52, in which it is filtered into eight sub-bands in the vertical direction in similar manner to that in which filtering into eight sub-bands in the horizontal direction was achieved in the horizontal filter arrangement 46. The horizontally and vertically filtered field is fed on a line-by-line basis into the output field store 54 to be passed from there to the quantiser 14. The store 54 can be considered to have been partitioned into an array of 64 (8×8) storage regions, in each of which a respective one of the 64 sub-bands is stored. Thus, successive fields of the input digital video signal are sub-band filtered and passed, duly filtered, to the quantiser 14 after a delay of two field intervals.

The transpose sequencer 50 produces read addresses for the intermediate field store 48, to control reading of the contents thereof into the vertical filter arrangement 52, as follows. As will be recalled, the signal as stored in the intermediate field store 48 comprises the lines of the original field, each divided horizontally into eight sub-bands. That is, the signal as stored in the dintermediate field store 48 can, as mentioned above, be considered to comprise eight columns. To enable the signal stored in the intermediate field store 48 to be vertically filtered by hardware of the same construction (the vertical filter arrangement 52) used to horizontally filter it, it must be transposed, that is rotated through 90 degrees, as it is read to the vertical filter arrangement 52, so that it comprises eight rows (as opposed to columns). The transpose sequencer 50 addresses the intermediate field store 48 in such a manner as to accomplish this.

The nature of the filtering produced by the combination of the horizontal filter arrangement 46 and the vertical filter arrangement 52 is such that data stored in the output field store 54 is somewhat scrambled and reordered by the output sequencer 56 before being passed to the rest of the apparatus for processing.

Figure 5:
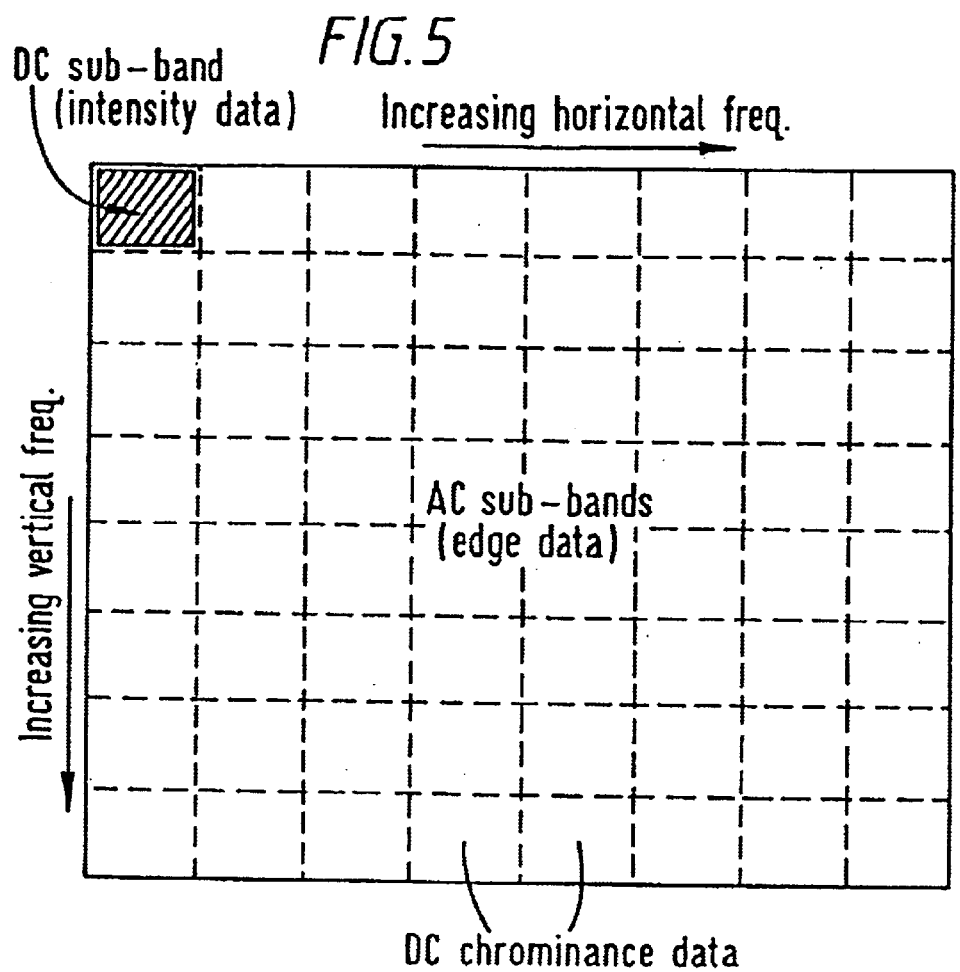
FIG. 5 illustrates a frequency separated video signal.

FIG. 5 illustrates the various sub band components produced if the input video signal is decomposed both horizontally and vertically into eight frequency components (this can be considered to be the data stored in the output field store 54 after it has had the reordering of the output sequencer 56 applied to it). Each of these sub bands or sub-pictures is represented by one of the blocks in FIG. 5. The upper left hand block represents the dc sub-band. This is the band of lowest horizontal and vertical frequency although in practice it doesn't necessarily represent only the constant portions of the signal with strictly zero frequency. This dc sub-band will contain the majority of the dc luminance information of the original input video signal. The relative importance of the remaining sub-bands to the eventual perception of the picture by a viewer varies. Generally speaking, the higher frequency sub-bands are less important to the eventual perception of a viewer. In relation to FIG. 5, the frequency which a particular sub-band component represents increases in moving downward and/or rightward in the array of blocks. Further bands of particular importance are those that contain any dc chrominance information. In the case of NTSC format signals, the lower two central blocks contain this information.

Figure 6:
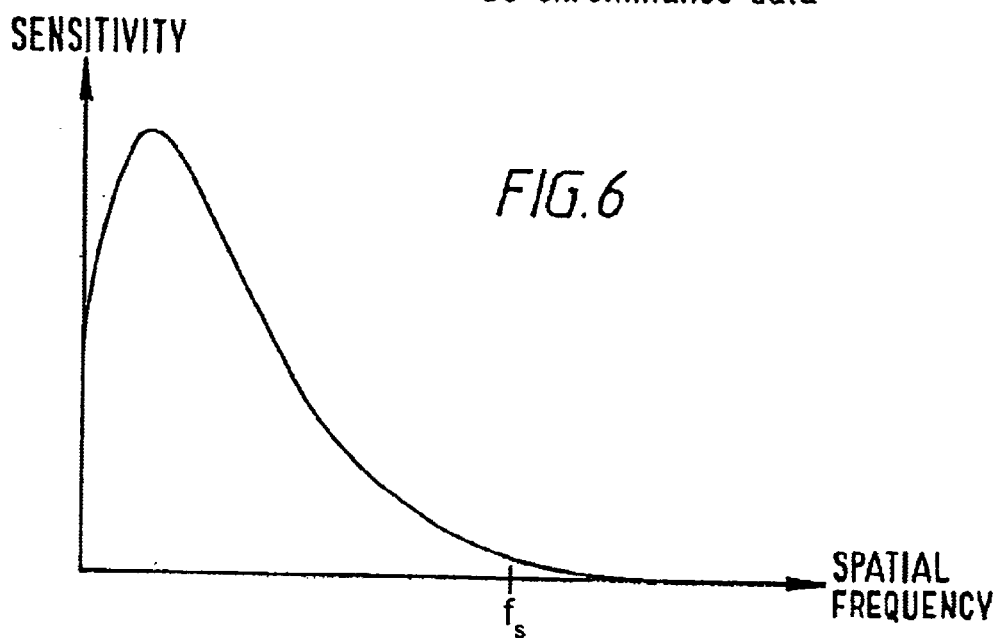
FIG. 6 illustrates the human psychovisual response to images of differing spatial frequency.

FIG. 6 illustrates the human psychovisual response to image components of differing spatial frequency. As can be seen, the level of human perception first rises and then steadily diminishes with increasing spatial frequency. This characteristic can be exploited in a data compression system with the realisation that components of higher spatial frequency can be subjected to higher degrees of quantisation with subsequent loss in information, without significantly degrading the perceived image that can be reconstructed.

FIG. 7 illustrates a data sequencer for controlling scanning of the decorrelated data. The data sequencer includes a nested arrangement of counters. The horizontal position counter 62 and the vertical position counter 64 can be nested within the sub band counter 60 or vice versa depending upon whether a intra-sub band (raster) scan is desired or an inter-sub band (non-raster) scan is required. It will be appreciated that when a counter is described as being nested within another counter then this means that the first counter will complete a full counting cycle for each increment in the value of the counter above it in the hierarchy. The value from the sub band counter 60 is fed to a sub band number generation programmable read only memory (PROM) 70 where it is converted into a sub band number. The output of the sub band number generation PROM is fed to both a horizontal pointer generation PROM 68 and a vertical pointer generation PROM 66 together with respective ones of the output from the horizontal position counter 62 and the vertical position counter 64. The horizontal pointer generation PROM 68 and the vertical pointer generation PROM 66 map the input values into physical horizontal and vertical addresses within the field store (not illustrated) where the quantised data is being stored. From this field store the quantised data is then fed to an entropy encoder.

It will be appreciated that the use of PROMs is particularly convenient as the ability to reprogram the mappings stored allows a considerable degree of flexibility.

When the data sequencer is in raster mode, the horizontal position counter 62 and vertical position counter 64 trace through a complete sub band before the sub band counter 60 is incremented. When the data sequencer is in non-raster mode the sub band counter 60 moves through a complete cycle for each increment in the combined horizontal position counter and vertical position counter 64. The combination of the horizontal position counter 62 and vertical position counter 64 can be considered as an intra-sub band counter 72, whereas the sub band counter 60 can be considered as an inter-sub band counter.

FIG. 9 illustrates a quantisation matrix as applied by the quantiser 14. In accordance with the characteristic shown in FIG. 6, the psychovisual sensitivity to each frequency component decreases with increasing frequency. The quantisation matrix exploits this by applying more severe quantisation to sub band components of higher frequency and thereby increases the degree to which they may be compressed.

The two columns of the quantisation matrix corresponding to the two highest horizontal frequency component ranges are shown filled with values of A. This indicates that whatever input data value is subject to quantisation from within these sub bands the result produced by the quantiser 14 is a single predetermined value (e.g. zero). This need not be done if these sub bands are subsequently to be completely removed from the data stream.

FIG. 8 illustrates the scan path effected by the data sequencer of FIG. 7. The two right most columns within the array of sub band component data correspond to frequencies not transmittable with the subsequent transmission signal. A cycles per picture width count of 288 corresponds to a frequency within the raster scan output of 5.37 MHz. The horizontal frequency components of the image manifest themselves on an intra-raster line basis in the transmission signal, i.e. a high horizontal spatial frequency component will produce a high frequency component within the horizontally rastered transmission signal. In contrast, vertical spatial frequency components only manifest themselves on an inter-raster line basis in the transmission signal due to the horizontal raster. Thus, the vertical spatial frequency components of the image are not rendered non-transmittable by the limited bandwidth of the eventual transmission signal format.

The sixth left most columns of the sub band array are scanned in a zig-zag pattern as shown. This zig-zag scanning can be carried out on an intra-sub band basis, with each complete sub band been fed to the entropy encoder 20 before passing onto the next sub band.

Alternatively, an inter-sub band scan can be used with a single data value from each sub band read out following the zig-zag, pattern to form a block of data. The scan is then repeated for different data values from each sub-band to form further blocks of data until all the data values of each sub band have been read.

The data scanned by the zig-zag pass represents that data that can eventually be transmitted with the transmission signal format concerned. The remaining data can either not be read at all, or can be read in the order shown. If the data is read then it will previously have been forced to have a single value by the application of the quantisation matrix which will result in efficient compression as described above. If the single value is zero then the result of entropy encoding of the two right most columns from the sub band array after inter-sub band scanning will be a sequence of end of block codes. These codes may already have been issued depending upon the values towards the end of the zig-zag scan.

The pattern illustrated in FIG. 8 is effected by appropriate programming of the sub band PROM 70 in the data sequencer 18.

The quantised data emerging from the quantiser 14 is fed to the entropy encoder 16. The entropy encoder 16 can encode the quantised data in accordance with one of the known techniques, such as that proposed by the Joint Photographic Experts Group mentioned above.

FIG. 10 illustrates a data recording and transmission apparatus. The data compressor 76 takes the form described previously. The combined action of the quantisation matrix of FIG. 9 and the data scan pattern of FIG. 8 mean that only that data that can ultimately be transmitted by the transmission signal format used is passed to the data recorder 78. The data recorder 78 can be a conventional digital video tape recorder or the like. When desired, the data is recovered from the data recorder 78 and fed to the data decompressor 80. The data decompressor carries out entropy decoding, data resequencing, dequantisation and interpolation with parameters complementary to those described for the data compression. The data recovered by the data decompressor is passed to a transmission signal generator 82 of standard form which converts the image data into the appropriate PAL or NTSC transmission format for broadcast.

Figure 11:
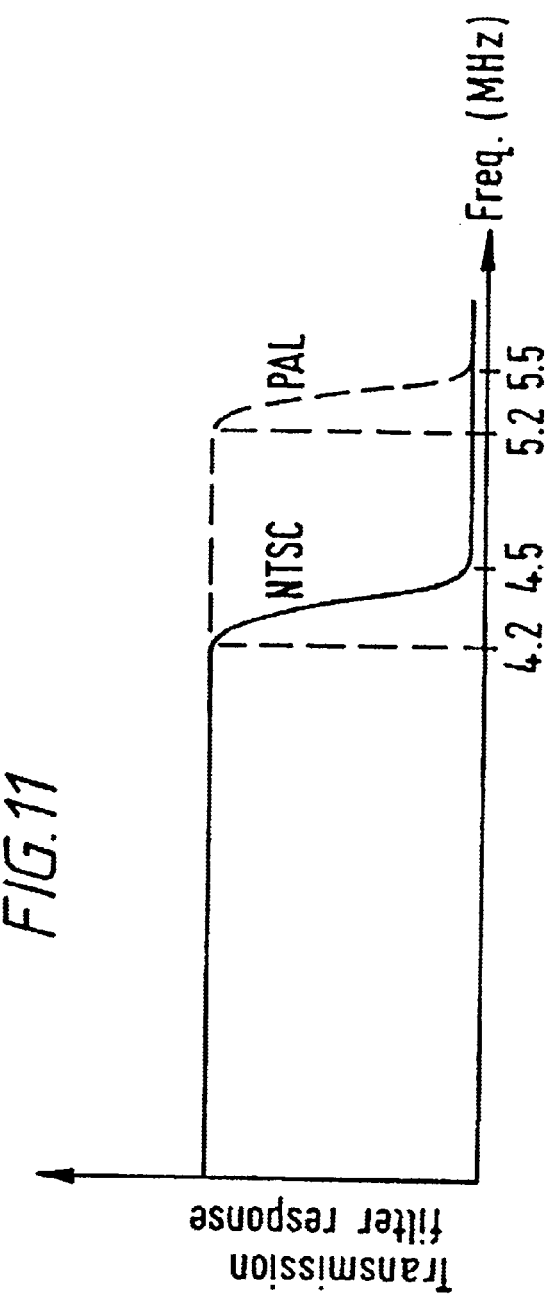
FIG. 11 illustrates possible bandwidth characteristics of the transmission system.

FIG. 11 illustrates the transmission filter response of the transmission signal generator 82 for both the PAL and NTSC standards. The NTSC signal is bandwidth limited to less than 4.5 MHz. The PAL signal is bandwidth limited to less than 5.5 MHz.

Figure 12:
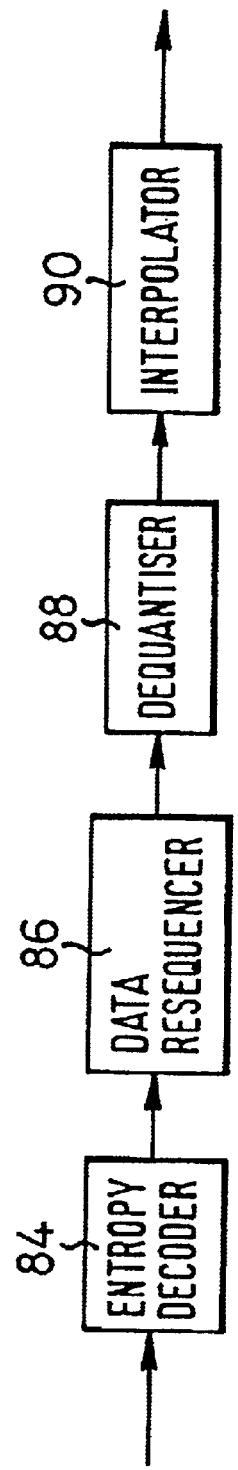
FIG. 12 illustrates a data decompression apparatus.

FIG. 12 illustrates the various components of the data decompressor 80. The data from the data recorder 78 is fed to an entropy decoder 84. The entropy decoder 84 applies the complementary coding rules applied by the entropy encoder 16 so as to recover the quantised data. The output from the entropy decoder 84 is fed to the data resequencer 86. The data resequencer 86 may comprise a circuit similar to that shown in FIG. 7 with different data stored in the various PROMs to effect resequencing of the data back to its original order. When the data has been resequenced, the data values for each sub band component are collected together and passed to the dequantiser 88 to have the appropriate dequantisation applied to them. The data from the highest horizontal frequency sub band components will not have made it this far through the system. The output from the dequantiser 88 is fed to an interpolator 90 which transforms from the spatial frequency domain back into a signal similar to that at the input 10 of FIG. 1. The output from the interpolator 90 is fed to the transmission signal generator 82.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An image data recording and transmission apparatus for input image data having multiple frequency components, said apparatus comprising:

data compressor means for separating said input image data into plural frequency components to produce frequency separated component data, said plural frequency components including a first range of frequencies defined by a bandwidth limited transmission format and a second range of frequencies outside said first range;

recorder means for storing said frequency separated component data within said first range and substantially none of said frequency separated component data within said second range on a recording medium;

interpolator means for interpolating said stored frequency separated component data read from said recording medium to produce reconstructed data; and transmission signal generator means for transmitting output image data in said bandwidth limited transmission format from said reconstructed data;

wherein said stored frequency separated component data does not include any data derived from said frequency separated component data within said second range, wherein said data compressor means includes quantisation means for quantising said frequency separated component data only in said first range and wherein said interpolator means includes dequantisation means for dequantising said stored frequency separated component data.

2. The image data recording and transmission apparatus according to claim 1, wherein said first range substantially corresponds to frequencies less than 4.5 Mhz.

3. The image data recording and transmission apparatus according to claim 1, wherein said first range substantially corresponds to frequencies less than 5.5 Mhz.

4. The image data recording and transmission apparatus according to claim 1, wherein said data compressor means includes encoder means for encoding said frequency separated component data and wherein said interpolator means includes decoder means for decoding said stored frequency separated component data.

5. The image data recording and transmission apparatus according to claim 1, wherein said plural frequency components include sub-band components representing different portions of a two-dimensional spatial frequency domain.

6. The image data recording and transmission apparatus according to claim 1, wherein said data compressor means includes sequencing means for sequencing said frequency separated component data within said first range separately from said frequency separated component data within said second range.

7. The image data recording and transmission apparatus according to claim 6, wherein said data compressor means includes second quantisation means for quantising said sequenced frequency separated component data within said second range and wherein said second quantisation means quantises said sequenced frequency separated component data components within said second range to a single value.

8. The image data recording and transmission apparatus according to claim 1, wherein said data compressor means includes sequencing means for sequencing only said frequency separated component data within said first range.

9. The image data recording and transmission apparatus according to claim 1, wherein said data compressor means further includes means for providing only said frequency separated component data within said first range to said recorder means.

10. An image data recording and transmission apparatus according to claim 1, where the data compressor means discards the frequency separated component data within said second range and does not pass the frequency separated component data within said second range to another component of the image data recording and transmission apparatus.

11. An image data recording and transmission apparatus according to claim 1, where said stored frequency separated component data does not include any added derived motion detection data.

12. An image data recording apparatus for input image data having multiple frequency components, said apparatus comprising:

data compressor means for separating said input image data into plural frequency components to produce frequency separated component data, said plural frequency components including a first range of frequencies defined by a bandwidth limited transmission format and a second range of frequencies outside said first range;

recorder means for storing said frequency separated component data within said first range and substantially none of said frequency separated component data within said second range on a recording medium;

wherein said stored frequency separated component data does not include any data derived from said frequency separated comrponent data within said second range, wherein said data compressor means includes quantisation means for quantising said frequency separated component data only in said first range and encoder means for encoding said quantised frequency separated component data.

13. The image data recording apparatus according to claim 12, wherein said first range substantially corresponds to frequencies less than 4.5 Mhz.

14. The image data recording apparatus according to claim 12, wherein said first range substantially corresponds to frequencies less than 5.5 Mhz.

15. The image data recording apparatus according to claim 12, wherein said plural frequency components include sub-band components representing different portions of a two-dimensional spatial frequency domain.

16. The image data recording apparatus according to claim 12, wherein said data compressor means includes sequencing means for sequencing said frequency separated component data within said first range separately from said frequency separated component data within said second range.

17. The image data recording apparatus according to claim 16, wherein said data compressor means includes seconid quantisation means for quantising said sequenced frequency separated component data within said second range and wherein said second quantisation means quantises said sequenced frequency separated component data within said second range to a single value.

18. The image data recording apparatus according to claim 12, wherein said data compressor means includes sequencing means for sequencing only said frequency separated component data within said first range.

19. The image data recording apparatus according to claim 12 wherein said data compressor means further includes means for providing only said frequency separated component data within said first range to said recorder means.

20. An image data recording apparatus according to claim 12, where the data compressor means discards the frequency separated component data within said second range and does not pass the frequency separated component data within said second range to another component of the image data recording apparatus.

21. An image data recording apparatus according to claim 12, where said stored frequency separated component data does not include any added derived motion detection data.

* * * * *